(12) United States Patent
Jensen

(10) Patent No.: US 6,456,682 B1
(45) Date of Patent: Sep. 24, 2002

(54) CORE SPRAY SPARGER T-BOX ATTACHMENT WITH CLAMP

(75) Inventor: Grant Clark Jensen, Morgan Hill, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,283

(22) Filed: Mar. 13, 2001

(51) Int. Cl.[7] .................................................. G21C 9/00
(52) U.S. Cl. .......................... 376/282; 376/352; 285/191
(58) Field of Search ................................. 376/245, 260, 376/352, 282; 29/890, 723, 727; 72/57; 285/319, 191

(56) References Cited

U.S. PATENT DOCUMENTS

| | | | |
|---|---|---|---|
| 706,983 A | * 8/1902 | H. Merrie et al. | 285/191 |
| 4,168,071 A | 9/1979 | Jacobson et al. | 277/606 |
| 4,834,935 A | 5/1989 | Daigle et al. | 376/292 |
| 4,859,403 A | 8/1989 | Dixon et al. | 376/286 |
| 5,345,484 A | 9/1994 | Deaver et al. | 376/407 |
| 5,709,116 A | * 1/1998 | Rieger et al. | 72/57 |
| 5,735,551 A | 4/1998 | Whitman et al. | 285/15 |
| 5,737,380 A | 4/1998 | Deaver et al. | 376/352 |
| 5,785,361 A | 7/1998 | Bourbour et al. | 285/382 |
| 5,839,192 A | * 11/1998 | Weems et al. | 29/890.031 |
| 5,901,192 A | 5/1999 | Deaver et al. | 376/282 |
| 5,912,936 A | 6/1999 | Charnley et al. | 376/282 |
| 5,947,529 A | 9/1999 | Jensen | 285/123.6 |
| 6,000,731 A | 12/1999 | Charnley et al. | 285/319 |
| 6,131,962 A | 10/2000 | Jensen et al. | 285/337 |
| 6,195,892 B1 | * 3/2001 | Weems et al. | 29/890.031 |
| 6,201,847 B1 | 3/2001 | Jensen et al. | 376/352 |
| 6,236,700 B1 | 5/2001 | Erbes et al. | |

OTHER PUBLICATIONS

EPO European Search Report, Jun. 14, 2002, three (3) pages.

* cited by examiner

Primary Examiner—Peter M. Poon
Assistant Examiner—Daniel Matz
(74) Attorney, Agent, or Firm—Armstrong Teasdale LLP (57) ABSTRACT

A core spray sparger T-box attachment assembly for a nuclear reactor pressure vessel includes a downcomer pipe coupling and a sparger T-box clamp. The downcomer pipe coupling includes a cylindrical outer housing, a center portion, and a plurality of vanes extending the outer housing to the center portion. The outer housing is coupled to a downcomer pipe and includes an extending flange. A draw bolt threadedly engages an axial bore in the center portion, and connects the downcomer pipe coupling to the sparger T-box clamp. The sparger T-box clamp includes an anchor having a draw bolt opening, and a plurality of legs extending from a face of the anchor. Clamp blocks are connected to the anchor. Stop bolts extend through stop bolt openings in the clamp blocks. Clamping elements are connected to the clamp blocks by clamp bolts. A seal plate having a draw bolt opening is coupled to the anchor with a plurality of adjusting screws.

24 Claims, 7 Drawing Sheets

CORE SPRAY SPARGER T-BOX ATTACHMENT WITH CLAMP

BACKGROUND OF INVENTION

This invention relates generally to nuclear reactors and more particularly, to apparatus and methods for repairing piping within reactor pressure vessels of such reactors.

A reactor pressure vessel (RPV) of a boiling water reactor (BWR) typically has a generally cylindrical shape and is closed at both ends, e.g., by a bottom head and a removable top head. A core shroud, or shroud, typically surrounds the core and is supported by a shroud support structure.

Boiling water reactors have numerous piping systems, and such piping systems are utilized, for example, to transport water throughout the RPV. For example, core spray piping is used to deliver water from outside the RPV to core spray spargers inside the RPV. The core spray piping and spargers deliver water flow to the reactor core.

Intergranular stress corrosion cracking (IGSCC) is a known phenomenon occurring in reactor components, such as structural members, piping, fasteners, and welds, exposed to high temperature water. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to IGSCC.

Conditions exist in the reactor which contribute to IGSCC of the core spray piping. One area of susceptibility in the core spray piping is the welded joints between the sparger T-box and its associated distribution headers. The sparger T-box is the junction where the core spray downcomer supply pipe penetrates the shroud branches to distribution sparger pipes. The core spray system prevents excessive fuel clad temperature in the event of a Loss of Coolant Accident (LOCA) by delivering cooling water to the core region of the reactor. In the event that through-wall circumferential cracking should occur at these welded joints, the system may be compromised.

In order to prevent unacceptable leakage and to ensure that the core spray system delivers the necessary volumetric flow rate to the reactor core, it would be desirable to provide a clamping system to provide structural integrity to the sparger T-box and to hold the welded joints together in the event that one or more welds fail.

SUMMARY OF INVENTION

A core spray sparger T-box attachment assembly for a nuclear reactor vessel includes a downcomer pipe coupling and a sparger T-box clamp. The pressure vessel includes a shroud, a sparger T-box penetrating the shroud, a plurality of sparger distribution header pipes coupled to the sparger T-box, and a downcomer pipe. The sparger header pipes include at least one sparger nozzle.

The downcomer pipe coupling includes a cylindrical outer housing, a center portion, and a plurality of vanes extending from an inner surface of the outer housing to the center portion. The outer housing is coupled to a downcomer pipe at one end, and includes a flange extending from the opposite end. The center portion includes a threaded axial bore therethrough. A draw bolt threadedly engages the axial bore of the center portion, and connects the downcomer pipe coupling to the sparger T-box clamp.

The sparger T-box clamp includes an anchor having a draw bolt opening, and a plurality of legs extending from a face of the anchor. The legs are configured to engage an inside surface of the shroud and are machined or trimmed so that the anchor face is parallel to the exterior surface of the sparger T-box. A first and a second clamp block are connected to opposite sides of the anchor with dove-tail joints. The clamp blocks are positioned to be substantially aligned with one another. Each clamp block includes a threaded stop bolt opening extending therethrough. A stop bolt extends through each stop bolt opening. Each stop bolt has a conical shaped distal end which is sized to mate with a conical shaped opening machined in the sparger distribution header pipes.

A first and a second clamping element are connected to the first clamp block and second clamp blocks by a plurality of clamp bolts. Also, a first and a second stop bolt extending through said stop bolt opening of said first and said second clamp block respectively.

A seal plate is coupled to the anchor with a plurality of adjusting screws. The seal plate includes a plurality of adjusting screw openings and a draw bolt opening sized to receive the draw bolt. The anchor include a plurality of threaded adjusting screw openings sized to recieve the adjusting screws.

The above described core spray sparger T-box attachment assembly mechanically couples the downcomer pipe to the shroud and sparger T-box. Also, the above described core spray sparger T-box attachment assembly provides a clamping system to provide structural integrity to the sparger T-box and to hold the welded joints together in the event that one or more welds fail.

DETAILED DESCRIPTION

Figure 1:
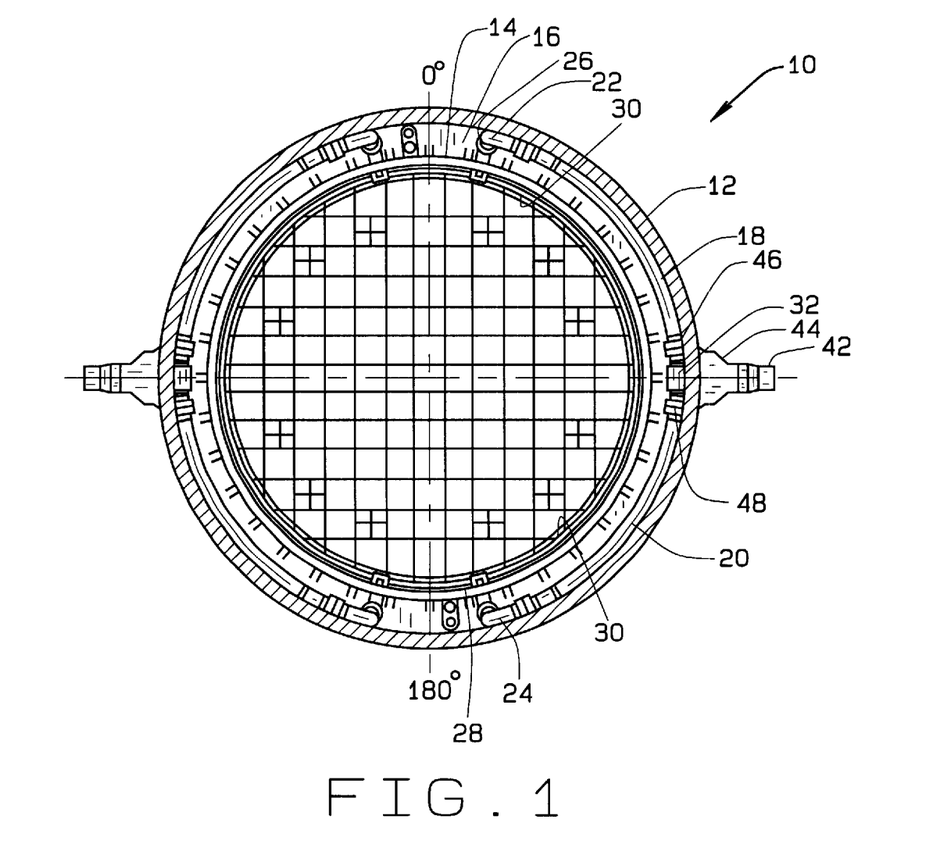
FIG. 1 is a top sectional view of a boiling water nuclear reactor pressure vessel.

FIG. 1 is a top sectional view of a boiling water nuclear reactor pressure vessel 10. Reactor pressure vessel 10 includes a vessel wall 12 and a shroud 14 which surrounds the reactor core (not shown) of pressure vessel 10. An annulus 16 is formed between vessel wall 12 and shroud 14. The space inside annulus 16 is limited with most reactor support piping located inside annulus 16.

Cooling water is delivered to the reactor core during a loss of coolant accident through core spray distribution header pipes 18 and 20 which are connected to downcomer pipes 22 and 24 respectively. Downcomer pipes 22 and 24 are connected to shroud 14 through sparger T-boxes 26 and 28 respectively, which are attached to shroud 14 and internal sparger pipes 30.

Distribution header pipes 18 and 20 diverge from an upper T-box 32 coupled to a safe end 42 of core spray nozzle 44. Header pipes 18 and 20 are coupled to upper T-box by pipe connectors 46 and 48 respectively. Pipe connectors 46 and 48 may be any pipe connectors known in the art, for example, ball flange connectors.

Figure 2:
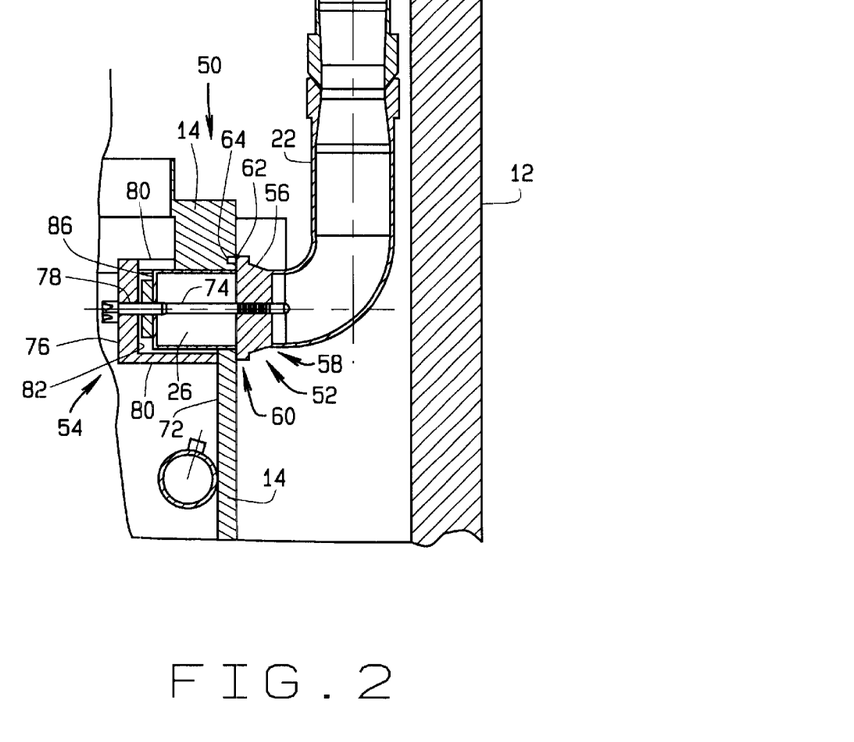
FIG. 2 is a side sectional view of a sparger T-box attachment assembly in accordance with an embodiment of the present invention.

FIG. 2 is a side sectional view of a sparger T-box attachment assembly 50 in accordance with an embodiment of the present invention. Sparger T-box attachment assembly 50 couples downcomer pipes 22 and 24 to sparger T-boxes 26 and 28 respectively, and clamps sparger pipes 30 to sparger T-boxes 26 and 28 to prevent separation of sparger pipes 30 from sparger T-boxes 26 and 28 in the event of a connecting weld failure. The sparger T-box attachment assembly includes a downcomer pipe coupling 52 and a sparger T-box clamp 54.

Figure 3:
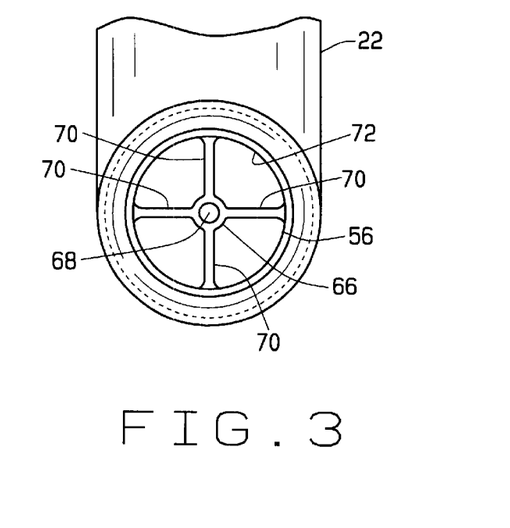
FIG. 3 is an elevation view of the downcomer coupling shown in FIG. 2 as viewed from the center of the reactor.

Referring also to FIG. 3, downcomer pipe coupling 52 includes a cylindrical outer housing 56 having a first end 58 and a second end 60. First end 58 is configured to couple to downcomer pipe 22 by any suitable means, for example by welding. A flange 62 extends from second end 60 of outer housing 56. Flange 62 is received into a circular groove 64 machined into shroud 14. Groove 64 is located so as to be concentric with sparger T-box 26 penetration through shroud 14. A center portion 66 having a threaded axial bore 68 therethrough is connected to outer housing 56 by a plurality of vanes 70 extending from an inner surface 72 of outer housing 56 to center portion 66. A draw bolt 74 threadedly engages axial bore 68 of said center portion 66. Draw bolt 74 connects downcomer pipe 52 to sparger T-box clamp 54. Of course, coupling 52 can be used to connect downcomer pipe 24 to sparger T-box 28.

Referring to FIGS. 2, 4, 5, and 6, sparger T-box clamp 54 includes an anchor 76 having a draw bolt opening 78, and a plurality of legs 80 extending from a first face 82 of anchor 76. Legs 80 are configured to engage an inside surface 84 of shroud 14 and are machined or trimmed so that anchor face 82 is parallel to an exterior surface 86 of sparger T-box 26.

A first and a second clamp block 88 and 90 are connected to opposite sides 92 and 94 of anchor 76. Clamp blocks 88 and 90 are positioned to be substantially aligned with one another. Specifically, clamp blocks 88 and 90 are connected to sides 92 and 94 of anchor with dove-tail joints 96 and 98 respectively. Dove-tail joints 96 and 98 permit clamp blocks to move relative to anchor 76 which eliminates the imposition of any stress on the sparger pipe to sparger T-box welds. Clamp blocks 88 and 90 partially surround sparger pipe 30.

Each clamp block 88 and 90 includes a threaded stop bolt opening 100 extending therethrough. A stop bolt 102 extends through each stop bolt opening 100. Each stop bolt 102 has a conical shaped distal end 104 which is sized to mate with a conical shaped opening 106 machined in sparger distribution header pipes 30. The conical shape of stop bolt end 104 and mating opening 106 minimizes interference with the flow stream in pipe 30 and also seals opening 106 to minimize leakage.

Figure 7:
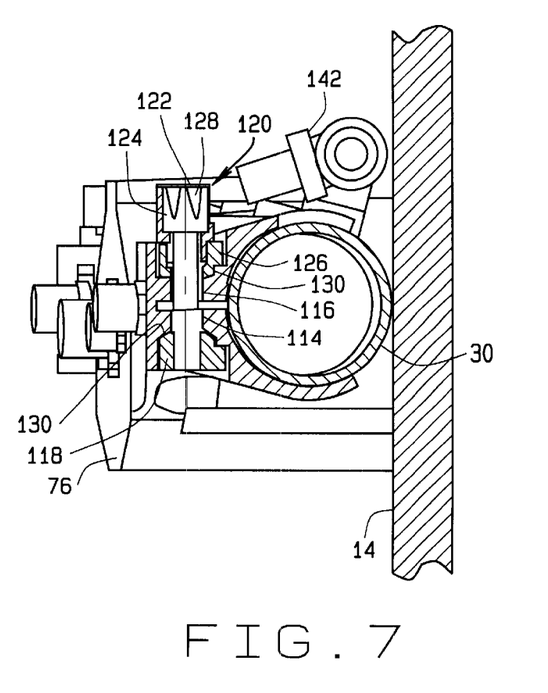
FIG. 7 is a cross sectional view through line A—A of the T-box attachment assembly shown in FIG. 6.

Referring also to FIG. 7, clamping elements 108 and 110 are connected to clamp blocks 88 and 90 respectively by clamp bolts 112. Clamp bolts 112 extend through clamp bolt openings 114 in clamp blocks 88 and 90, and clamp bolt openings 116 in clamping elements 108 and 110. Spherical nuts 118 secure clamp bolts 112. Clamping elements 108 and 110 oppose clamp blocks 88 and 90 to provide a clamping action as clamp bolts 112 are tightened.

A clamp bolt keeper 120 couples to clamp bolt head 122 to prevent clamp bolt 112 from loosening. Keeper 120 includes a crimp collar 124 threaded into a spherical collar 126. Crimp collar 124 to spherical collar 126 threads are opposite of the threads on clamp bolt 112. Specifically, in one embodiment, clamp bolt 112 has right hand threads, and spherical collar 124 has left hand threads. In an alternate embodiment, clamp bolt 112 has left hand threads, and spherical collar 124 has right hand threads. To hold clamp bolt 112 in place, crimp collar 124 is deformed into flutes 128 in clamp bolt head 122.

Referring also to FIGS. 8, 9, 10, and 11, spherical seats 130 are machined into clamp blocks 88 and 90, and into clamping elements 108 and 110. Spherical seats 130 are concentrically aligned with clamp bolt openings 114 and 116. Also, spherical nut 118 and spherical collar 126 are keyed to clamp blocks 88 and 90 and clamping elements 108 and 110. Specifically, spherical nut 118 and spherical collar 126 includes a key portion 129, and spherical seats include a keyway 131 sized to receive key portion 129. The interface of key portion 129 with keyway 131 prevents spherical nut 118 and spherical collar 126 from rotating. Spherical seats 130 mitigate any bending forces imposed on clamp bolts 112 and provide flexibility to sparger T-box clamp 54 by permitting clamping elements 108 and 110 to move slightly to adjust and conform to the exterior contour of sparger pipe 30.

Figure 8:
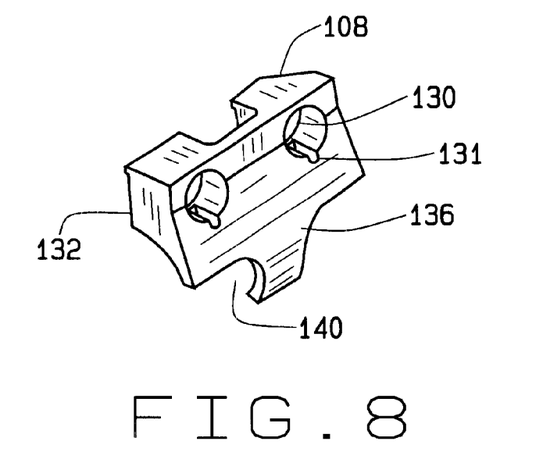
FIG. 8 is a perspective view of one clamping element shown in FIG. 5.
Figure 9:
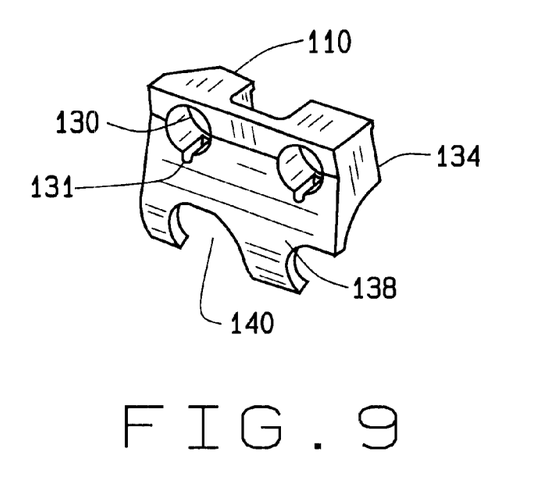
FIG. 9 is a perspective view of the other clamping element shown in FIG. 5.
Figure 10:
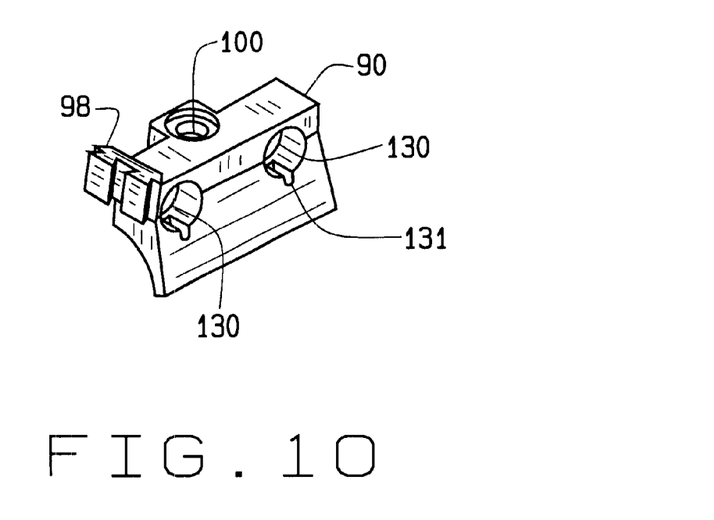
FIG. 10 is a perspective view of one clamp block shown in FIG. 5.
Figure 11:
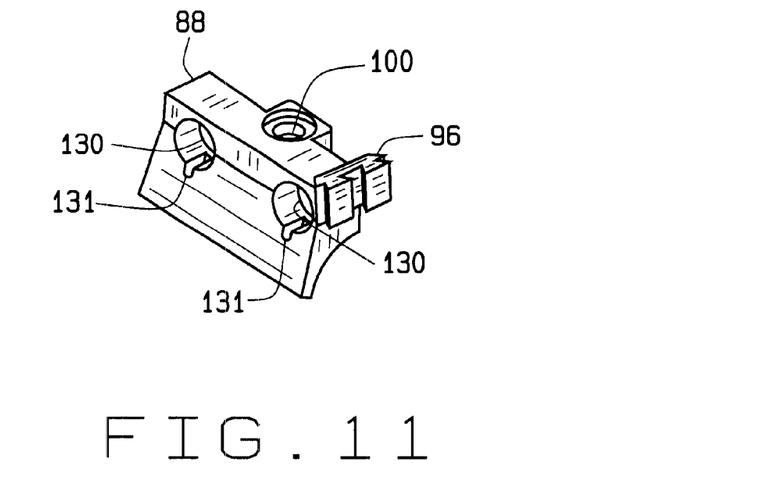
FIG. 11 is a perspective view of the other clamp block shown in FIG. 5.

Further clamping elements 108 and 110 include base portions 132 and 134 and engagement portions 136 and 138 respectively. Engagement portions 136 and 138 include cut-outs 140 sized to receive a sparger nozzle 142.

Referring again to FIG. 4, a seal plate 144 is coupled to anchor 76 with adjusting screws 146. Seal plate 144 includes adjusting screw openings 148 and a draw bolt opening 150 sized to receive draw bolt 74 in a close tolerance fit. Anchor 76 includes threaded adjusting screw openings 152 sized to receive adjusting screws 146. A distal end portion 154 of adjusting screws 146 includes a circumferential groove 156 sized to receive a dowel pin 158 pressed into seal plate 144 to attach adjusting screws 146 to seal plate 144. A shank portion 160 of adjusting screws 146 are threaded into adjusting screw openings 152. As adjusting screws are torqued, seal plate 144 is advanced into close contact with exterior surface 86 of sparger T-box 26 to seal draw bolt opening 151 in T-box 26. Keepers 162 prevent adjusting screws from loosening. Keepers 162 mate with seats 164 concentric with adjusting screw openings 152. Keepers 162 include left hand threads (not shown) to mate with threads 165 in seats 164.

Figure 4:
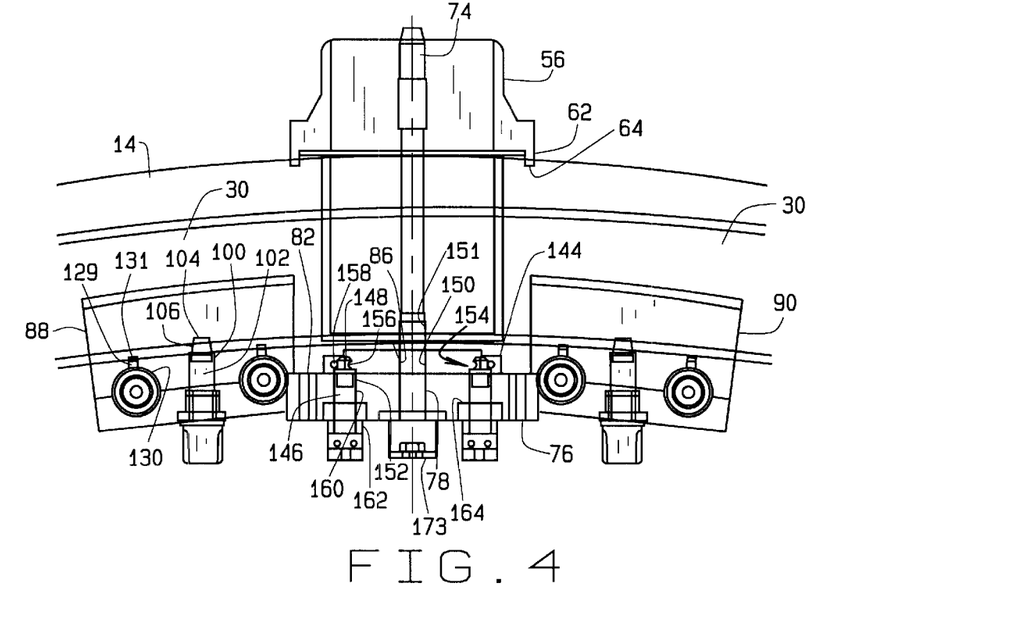
FIG. 4 is a top view of the sparger T-box attachment assembly shown in FIG. 2.
Figure 5:
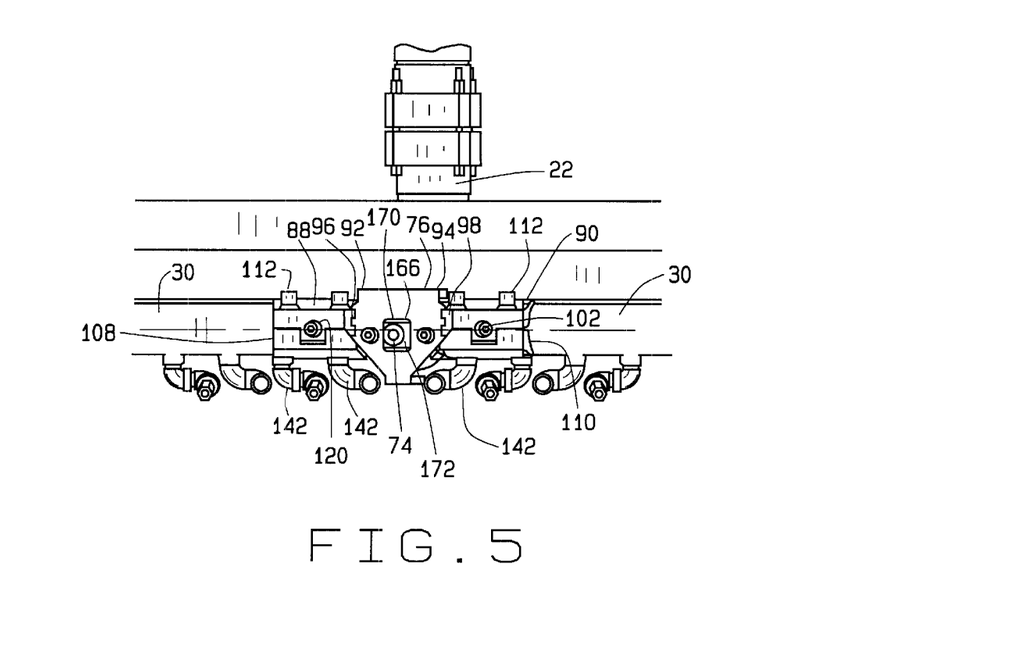
FIG. 5 is a front view of the sparger T-box attachment assembly shown in FIG. 2.
Figure 6:
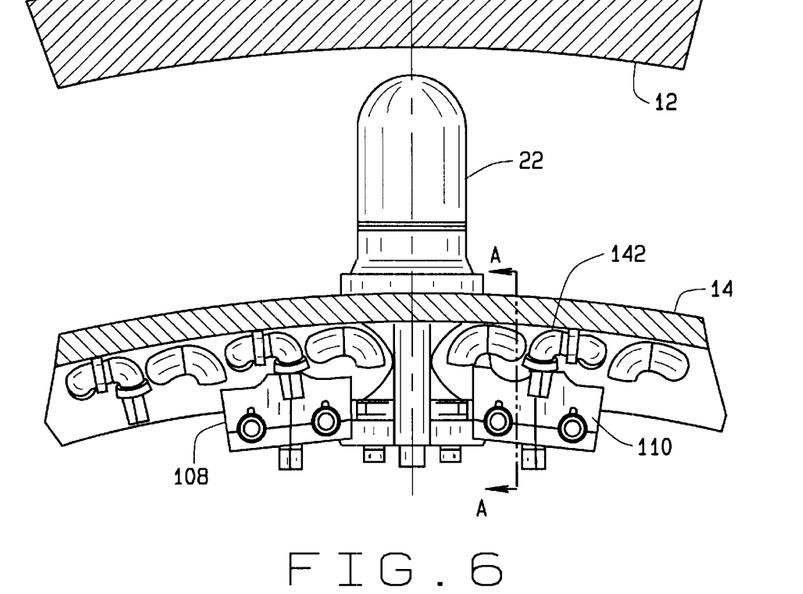
FIG. 6 is a bottom view of the sparger T-box attachment assembly shown in FIG. 2.

Referring to FIGS. 4 and 5, anchor 76 further includes a rectangular depression 166 in a second face 168 of anchor 76. Draw bolt opening 78 is located in rectangular depression 166. A draw bolt keeper 170 having a rectangular portion 172 is received in rectangular depression 166 to prevent draw bolt 74 from loosening. Draw bolt keeper 170 also includes a crimp collar 173.

Figure 12:
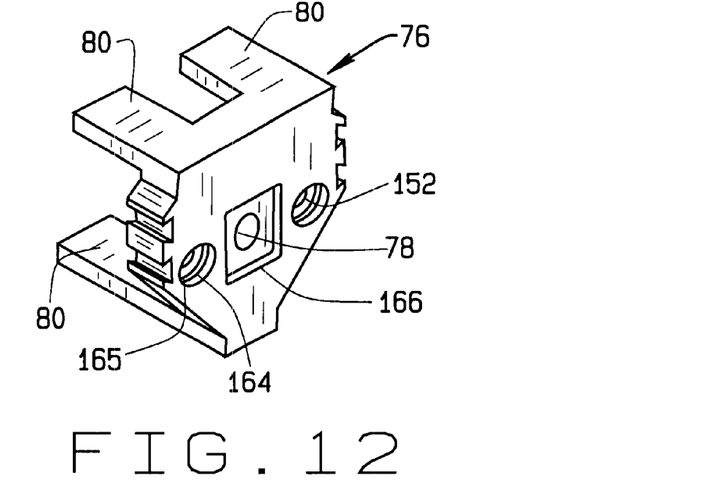
FIG. 12 is a perspective view of one embodiment of a clamp anchor in accordance with one embodiment of the present invention.
Figure 13:
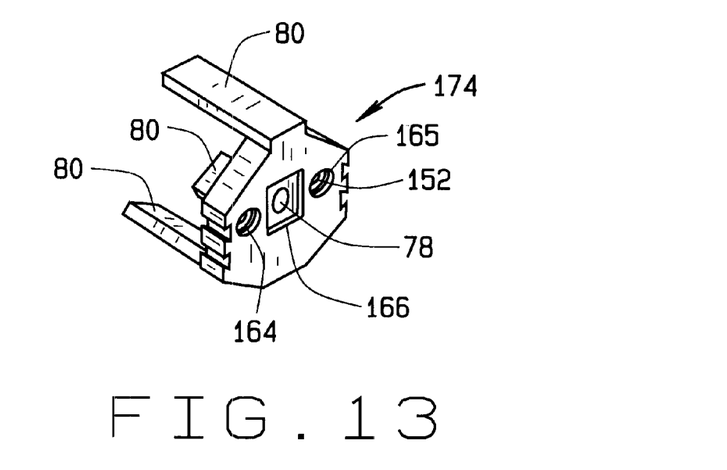
FIG. 13 is a perspective view of one embodiment of a clamp anchor in accordance with another embodiment of the present invention.

FIG. 12 is perspective view of anchor 76. FIG. 13 is a perspective view of an anchor 174 in accordance with another embodiment of the present invention. Anchor 174 is similar to anchor 76 and includes a draw bolt opening 78, legs 80, keeper depression 166, adjusting screw openings 152, and adjusting bolt seats 164.

To install a replacement downcomer pipe 22, the original piping is severed in close proximity to the outside surface of shroud 14. Circular groove 64 is machined into shroud 14 by any suitable method, for example electrode discharge machining (EDM). Groove 64 is concentric with sparger T-box 26 penetration through shroud 14. A draw bolt opening is machined in T-box 26 and conical stop bolt openings 100 are machined in sparger pipes 30 equidistant from the center of sparger T-box 26.

First end 58 of outer housing is coupled to downcomer pipe 22 by any suitable means, for example welding. Flange 62 is then positioned in groove 64. T-box clamp 54 is positioned around sparger pipes 30 and sparger T-box 26 with anchor legs 80 engaging inner surface 72 of shroud 14. Draw bolt 74 with keeper 170 is inserted through draw bolt opening and threaded into axial bore 66 of coupling center portion 68 and tightened. Stop bolts 102 are threaded through stop bolt openings in clamp blocks 88 and 90 and tightened so as to seat in conical stop bolt openings 100 in sparger pipes 30.

Clamp bolts extending through clamp bolt openings 114 and 116 in clamp blocks 88 and 90 and clamping elements 108 and 110 are tightened to exert a clamping force on sparger pipes 30. Adjusting screws are tightened to move seal plate 144 into contact with exterior surface 86 of sparger T-box 26. The crimp collars of all the keepers are deformed into flutes of the corresponding bolt heads to prevent the bolts from loosening.

The above described core spray sparger T-box attachment assembly 50 mechanically couples downcomer pipe 22 to shroud 14 and sparger T-box 26. Also, the above described core spray sparger T-box attachment assembly 50 provides a clamping system to provide structural integrity to sparger T-box 26 and to hold the sparger pipes 30 to T-box 26 welded joints together in the event that one or more welds fail.

While the invention has been described in terms of various specific embodiments, those skilled in the art will recognize that the invention can be practiced with modification within the spirit and scope of the claims.

What is claimed is:

1. A core spray sparger T-box attachment assembly for a nuclear reactor pressure vessel, the pressure vessel comprising a shroud, a sparger T-box penetrating the shroud, a plurality of sparger distribution header pipes coupled to the sparger T-box, and a downcomer pipe, the sparger header pipes comprising at least one sparger nozzle, said sparger T-box assembly comprising a downcomer pipe coupling and a sparger T-box clamp, said downcomer pipe coupling comprising:
   a cylindrical outer housing having a first end and a second end, said first end configured to couple to a downcomer pipe, said outer housing comprising a flange extending from said second end;
   a center portion comprising a threaded axial bore therethrough; and
   a plurality of vanes extending from an inner surface of said outer housing to said center portion; and
   a draw bolt threadedly engaging said axial bore of said center portion, said draw bolt connecting said downcomer pipe coupling to said sparger T-box clamp.

2. An attachment assembly in accordance with claim 1 wherein said sparger T-box clamp comprises:
   an anchor comprising a draw bolt opening;
   a first and a second clamp block connected to said anchor, said first and said second clamp block substantially aligned with one another, each said clamp block comprising a threaded stop bolt opening extending therethrough;
   a first and a second clamping element, said first clamping element connected to said first clamp block and said second clamping element connected to said second clamp block; and
   a first and a second stop bolt extending through said stop bolt opening of said first and said second clamp block respectively.

3. An attachment assembly in accordance with claim 2 further comprising a seal plate coupled to said anchor with a plurality of adjusting screws, said seal plate comprising a plurality of adjusting screw openings and a draw bolt opening sized to receive said draw bolt, said anchor further comprising a plurality of threaded adjusting screw openings extending therethrough.

4. An attachment assembly in accordance with claim 3 wherein the distal end portion of each said adjusting screw comprises a circumferential groove, each said adjusting screw is coupled to said seal plate by a dowel pin, said dowel pin extending at least partially into said seal plate adjusting screw opening and positioned so as to interface with said adjusting screw groove.

5. An attachment assembly in accordance with claim 2 wherein said anchor further comprises a plurality of legs extending from a face of said anchor, said plurality of legs configured to engage an inside surface of a shroud.

6. An attachment assembly in accordance with claim 1 wherein said sparger T-box clamp further comprises dovetail joints connecting said first and said second clamp blocks to said anchor.

7. An attachment assembly in accordance with claim 2 wherein said first clamp block and said first clamping element comprises a plurality of aligned clamp bolt openings, and said second clamp block and said second clamping element comprises a plurality of aligned clamp bolt openings, said sparger T-box clamp further comprising a plurality of clamp bolts extending through said aligned clamp bolt openings of said first and said second clamp blocks and said first and second clamping elements.

8. An attachment assembly in accordance with claim 7 wherein each said clamp bolt comprises a clamp bolt head and a shaft comprising threads, said sparger T-box clamp further comprising at least one clamp bolt keeper and at least one spherical clamp bolt nut sized to threadedly engage said clamp bolt shaft, each said clamp bolt keeper comprising a crimp collar and a spherical collar, said spherical collar comprising an opening having threads, said threads angled opposite said clamp bolt threads, said crimp collar threadedly coupled to said spherical collar, said crimp collar sized to mate with said clamp bolt head.

9. An attachment assembly in accordance with claim 8 wherein said first clamp block, said first clamping element, said second clamp block, and said second clamping element each comprising a plurality of spherical seats concentrically aligned with said plurality of clamp bolt openings, each said spherical seat sized to receive a spherical collar or a spherical clamp bolt nut.

10. An attachment assembly in accordance with claim 9 wherein said spherical collar and said spherical clamp bolt nut comprise a key portion, and said spherical seats comprise a keyway sized to receive said key portion.

11. An attachment assembly in accordance with claim 2 wherein said first and said second clamping elements each comprise a base portion and an engagement portion extending from said base portion, said engagement comprising at least one cut-out sized to receive a sparger nozzle.

12. A core spray piping system for a reactor pressure vessel in a nuclear reactor, said piping system comprising:
a core spray nozzle;
a downcomer pipe coupled to said core spray nozzle;
a shroud having an inner surface and an outer surface;
a sparger T-box penetrating said shroud, said shroud outer surface comprising a groove concentric with said sparger T-box penetration;
a plurality of sparger distribution header pipes coupled to said sparger T-box, said sparger header pipes comprising at least one sparger nozzle; and
a sparger T-box attachment assembly comprising a downcomer pipe coupling and a sparger T-box clamp, said downcomer pipe coupling comprising:
a cylindrical outer housing having a first end and a second end, said first end coupled to said downcomer pipe, said outer housing comprising a flange extending from said second end;
a center portion comprising a threaded axial bore therethrough; and
a plurality of vanes extending from an inner surface of said outer housing to said center portion; and
a draw bolt threadedly engaging said axial bore of said center portion, said draw bolt connecting said downcomer pipe coupling to said sparger T-box clamp.

13. A core spray piping system in accordance with claim 12 wherein said sparger T-box clamp comprising:
an anchor comprising a draw bolt opening;
a first and a second clamp block connected to said anchor, said first and said second clamp block substantially aligned with one another, each said clamp block comprising a threaded stop bolt opening extending therethrough;
a first and a second clamping element, said first clamping element connected to said first clamp block and said second clamping element connected to said second clamp block; and
a first and a second stop bolt extending through said stop bolt opening of said first and said second clamp block respectively.

14. A core spray piping system in accordance with claim 13 wherein said sparger T-box attachment assembly further comprises a seal plate coupled to said anchor with a plurality of adjusting screws, said seal plate comprising a plurality of adjusting screw openings and a draw bolt opening sized to receive said draw bolt, said anchor further comprising a plurality of threaded adjusting screw openings extending therethrough.

15. A core spray piping system in accordance with claim 13 wherein the distal end portion of each said adjusting screw comprises a circumferential groove, each said adjusting screw is coupled to said seal plate by a dowel pin, said dowel pin extending at least partially into said seal plate adjusting screw opening and positioned so as to interface with said adjusting screw groove.

16. A core spray piping system in accordance with claim 13 wherein said anchor further comprises a plurality of legs extending from a first face of said anchor, said plurality of legs engaging said inner surface of said shroud.

17. A core spray piping system in accordance with claim 13 wherein said sparger T-box clamp further comprises dovetail joints connecting said first and said second clamp blocks to said anchor.

18. A core spray piping system in accordance with claim 13 wherein said first clamp block and said first clamping element comprises a plurality of aligned clamp bolt openings, and said second clamp block and said second clamping element comprises a plurality of aligned clamp bolt openings, said sparger T-box clamp further comprising a plurality of clamp bolts extending through said aligned clamp bolt openings of said first and said second clamp blocks and said first and second clamping elements.

19. A core spray piping system in accordance with claim 18 wherein each said clamp bolt comprises a clamp bolt head and a shaft comprising threads, said sparger T-box clamp further comprising at least one clamp bolt keeper and at least one spherical clamp bolt nut sized to threadedly engage said clamp bolt shaft, each said clamp bolt keeper comprising a crimp collar and a spherical collar, said spherical collar comprising an opening having threads, said threads angled opposite said clamp bolt threads, said crimp collar threadedly coupled to said spherical collar, said crimp collar sized to mate with said clamp bolt head.

20. A core spray piping system in accordance with claim 19 wherein said first clamp block, said first clamping element, said second clamp block, and said second clamping element each comprising a plurality of spherical seats concentrically aligned with said plurality of clamp bolt openings, each said spherical seat sized to receive a spherical collar or a spherical clamp bolt nut.

21. A core spray piping system in accordance with claim 20 wherein said spherical collar and said spherical clamp bolt nut comprise a key portion, and said spherical seats comprise a keyway sized to receive said key portion.

22. A core spray piping system in accordance with claim 13 wherein said first and said second clamping elements each comprise a base portion and an engagement portion extending from said base portion, said engagement comprising at least one cut-out sized to receive a sparger nozzle.

23. A core spray piping system in accordance with claim 13 wherein said first and said second stop bolts comprising a conical shaped distal end, and said sparger distribution header pipes comprising conical shaped openings therein positioned and sized to receive said conical shaped distal end of said first and said second stop bolts.

24. A core spray piping system in accordance with claim 13 wherein said anchor further comprises a rectangular depression in a second face of said anchor, said draw bolt opening located in said rectangular depression, said downcomer pipe coupling further comprising a draw bolt keeper sized and shaped to be received in said rectangular depression in said anchor second face.

* * * * *